H. B. MANNING.
DEMOUNTABLE RIM.
APPLICATION FILED SEPT. 21, 1915.

1,239,118.

Patented Sept. 4, 1917.
2 SHEETS—SHEET 1.

Inventor
H. B. Manning
By *Chandler Chandler*
Attorneys

Witnesses

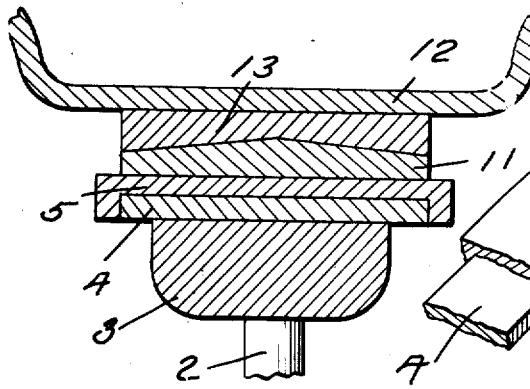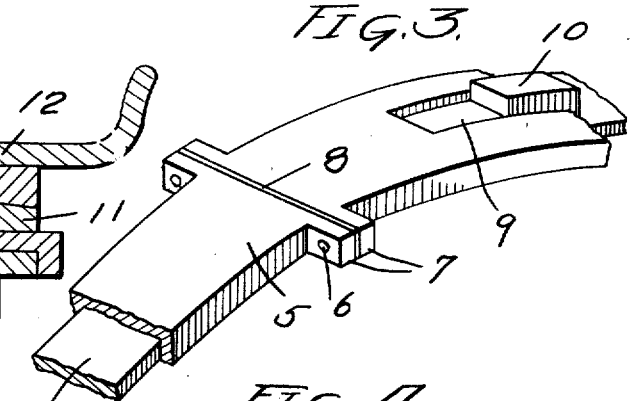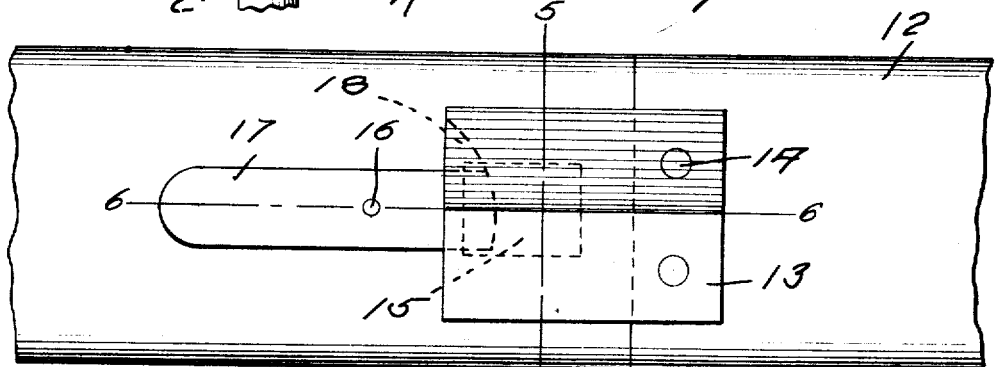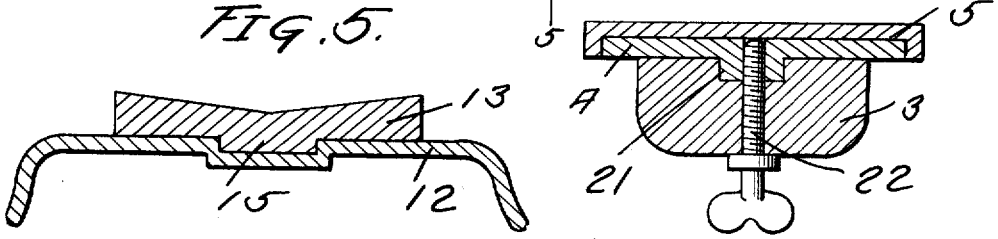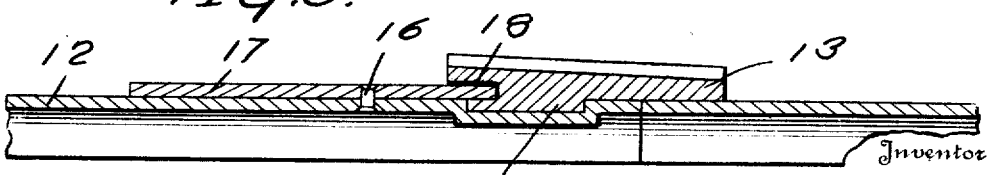

UNITED STATES PATENT OFFICE.

HERBERT B. MANNING, OF FALL RIVER MILLS, CALIFORNIA.

DEMOUNTABLE RIM.

1,239,118.   Specification of Letters Patent.   Patented Sept. 4, 1917.

Application filed September 21, 1915. Serial No. 51,807.

*To all whom it may concern:*

Be it known that I, HERBERT B. MANNING, a citizen of the United States, residing at Fall River Mills, in the county of Shasta, State of California, have invented certain new and useful Improvements in Demountable Rims; and I do hereby declare the following to be a full, clear, and exact description of the invention, such as will enable others skilled in the art to which it appertains to make and use the same.

This invention relates to a demountable rim.

An object of the invention resides in the provision of a rim which may be tightened upon the wheel and which will be securely held in position.

A further object of the invention resides in so constructing the rim that the parts thereof may be easily and quickly applied.

With these and other objects in view such as will appear as my description progresses, my invention comprises the combination and arrangement of parts as set forth in and falling within the scope of the appended claim.

In the drawing:

Fig. 2 is an enlarged sectional view on line 2—2 of Fig. 1;

Fig. 3 is an enlarged detail showing the manner of securing the ends of the movable ring together and showing also the stop upon the felly band;

Fig. 4 is a fragmental view of the means for securing the ends of the rim together;

Fig. 5 is a section on line 5—5 of Fig. 4;

Fig. 6 is a section on line 6—6 of Fig. 4;

Fig. 8 is a detail showing the manner of securing the felly band to the felly.

Referring to the drawing by reference characters wherein like parts are indicated by like characters throughout the several views:

Figure 1:
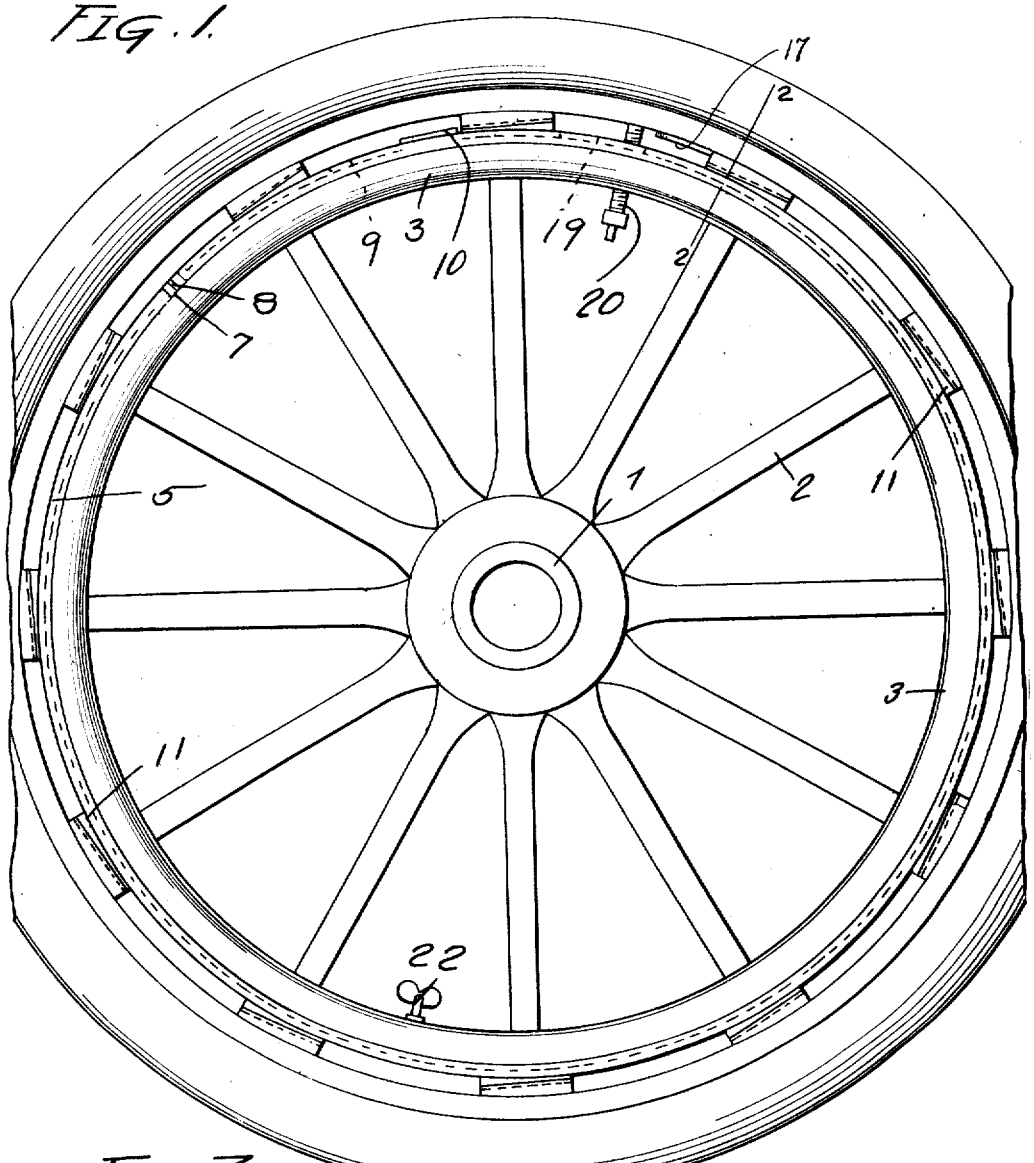
Figure 1 is an elevational view of a wheel showing the rim constructed in accordance with my invention, mounted thereon.
Figure 7:
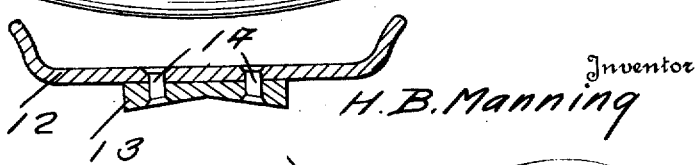
Fig. 7 is a sectional view showing the wedge blocks upon the rim.

In the embodiment of the invention shown in the drawing, I have illustrated a wheel which includes a hub 1, a plurality of spokes 2 and a felly 3. Mounted on the felly 3 is a felly band 4. A movable ring 5 having a channel therein for the reception of the felly band 4 is mounted upon the said felly band. The ends of this ring are secured together by means of bolts 6 which pass through ears 7, the said bolts passing through one of the ears of each pair freely and in threaded engagement with the other. A rubber packing 8 is interposed between the ends of the ring 5 and the ears 7 to allow the said ring to be tightened. This ring 5 is provided with an elongated slot 9 through which a lug 10 which is formed upon the felly band 4 extends, which lug prevents the movement of the ring after it has been secured in position. Formed upon the ring 5 at a plurality of points, which points are in alinement with the ends of the spokes 2 are wedge blocks 11. Mounted upon the ring 5 is a rim 12 which is provided with a plurality of wedge blocks 13, which blocks are adapted to coöperate with the wedge blocks 11 on the ring to maintain the rim in place.

In order that the rim may be readily placed within a tire, I have formed the same in two sections and have secured one of the wedge blocks 13 to one end of the rim by rivets 14 so that the said block bridges the joint between the ends of the rim as illustrated in Fig. 4 of the drawing. The face of this block 13 which is adjacent the rim is provided with an integral block 15 which seats in a corresponding depression in the rim 12. Pivotally mounted, at 16, on the end of the rim opposite to that to which the aforementioned block 13 is secured is a lever 17 which is provided with a cam head 18. This head is arranged to seat in a correspondingly shaped pocket in the block 13 so that it will maintain the ends of the rim in their locked positions as will be readily understood. The ring 5 is provided with an elongated slot 19 through which the valve stem 20 extends.

Formed on the inner face of the felly band 4 is a bur 21 with which a thumb screw 22 is engaged, which thumb screw extends through the felly and maintains the ring in position upon the same.

In applying the device to a wheel the ring is first secured upon the felly band with the lug 10 extending upwardly through the slot 9 in the band and with the adjacent wedge block 11 in slight spaced relation thereto. The rim is inserted in a tire shoe and the ends locked together. It is then placed upon the wheel. This rim is placed so that the large end of the wedge block 13 abuts against the lug 10. The ears 7 are then tapped with a hammer or other suitable implement so that the wedge blocks 11 will be forced beneath the wedge blocks 13 and will thus maintain the rim in tight relation to the felly band. This movement of the ring is permitted because of the fact that the lug 10 extends through the slot 9 and the valve stem 20 through the slot 19.

From the foregoing description it will be seen that I have provided a demountable rim which may be readily secured on a wheel and which will be prevented from accidental displacement.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claim.

What I claim is:—

In a demountable rim construction the combination with a felly and a band mounted thereon, of a ring slidable upon the band and having a longitudinal slot formed therein, a lug on the band projecting through and above said slot, a plurality of wedge blocks formed at intervals upon the ring, a rim, a plurality of wedge blocks formed upon the inner surface of the rim in opposition to the wedge blocks carried by the ring, and means for securing the ring against movement. said lug forming a stop to the movement of the rim and said ring being adapted to be relatively rotated to lock the ring and rim together when said lug has stopped the rim.

In testimony whereof, I affix my signature, in the presence of two witnesses.

HERBERT B. MANNING.

Witnesses:
 L. M. Cox,
 G. N. Wilson.